(12) United States Patent
Teslak et al.

(10) Patent No.: US 7,232,192 B2
(45) Date of Patent: Jun. 19, 2007

(54) DEADBAND REGENERATIVE BRAKING CONTROL FOR HYDRAULIC HYBRID VEHICLE POWERTRAIN

(75) Inventors: Chris Teslak, Plymouth, MI (US); Cliff Carlson, Fenton, MI (US); Ron Kepner, Ann Arbor, MI (US); Chuanchi Tang, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 10/883,320

(22) Filed: Jul. 1, 2004

(65) Prior Publication Data

US 2006/0001314 A1 Jan. 5, 2006

(51) Int. Cl.
*B60T 8/64* (2006.01)
*B60T 13/10* (2006.01)
(52) U.S. Cl. .................. 303/152; 303/10; 180/165; 60/414
(58) Field of Classification Search ............... 303/112, 303/152, 113.1, 10, 11, 413, 414, 416; 180/165
See application file for complete search history.

(56) References Cited

U.S. PATENT DOCUMENTS

| | | | |
|---|---|---|---|
| 3,990,235 A | | 11/1976 | Bauchet |
| 4,741,410 A | * | 5/1988 | Tunmore ................. 180/165 |
| 4,760,697 A | | 8/1988 | Heggie et al. |
| 4,986,383 A | | 1/1991 | Evans |
| 5,495,912 A | | 3/1996 | Gray, Jr. et al. |
| 5,505,527 A | | 4/1996 | Gray, Jr. et al. |
| 5,511,859 A | * | 4/1996 | Kade et al. ................. 303/3 |
| 6,454,033 B1 | | 9/2002 | Nathan et al. |
| 6,663,197 B2 | * | 12/2003 | Joyce ......................... 303/152 |
| 6,758,295 B2 | * | 7/2004 | Fleming ..................... 180/165 |
| 6,813,553 B2 | * | 11/2004 | Nakamura et al. .......... 303/112 |

FOREIGN PATENT DOCUMENTS

EP 0047643 3/1982

OTHER PUBLICATIONS

SAE Technical Paper Series 2002-01-3128, R.P. Kepner, Ford Motor Company, Hydraulic Power Assist—A Demonstration of Hydraulic Hybrid Vehicle Regenerative Braking in a Road Vehicle Application, Nov. 18-20, 2002, pp. 1-8.

* cited by examiner

*Primary Examiner*—Thomas Williams
(74) *Attorney, Agent, or Firm*—David B. Kelley; MacMillan, Sobanski & Todd, LLC

(57) ABSTRACT

A system for braking the wheels of a hydraulic hybrid vehicle includes a brake pedal having a range of pedal displacement including a deadband displacement range, an accumulator containing fluid at relatively high pressure, a reservoir containing fluid at lower pressure, a pump/motor having variable volumetric displacement connected to the accumulator and reservoir, and driveably connected to the wheels; a system responsive to brake pedal displacement in the deadband range for placing the pump/motor in a pump state wherein the pump/motor is driven by the wheels and pumps fluid from the reservoir to the accumulator; and a control valve for changing the volumetric displacement of the pump/motor in response to displacement of the brake pedal.

15 Claims, 3 Drawing Sheets

US 7,232,192 B2

DEADBAND REGENERATIVE BRAKING CONTROL FOR HYDRAULIC HYBRID VEHICLE POWERTRAIN

BACKGROUND OF THE INVENTION

The invention relates in general to a hybrid vehicle drive system having a primary power source, such as a conventional internal combustion engine, and another power source, such as a source of high pressure pneumatic or hydraulic fluid. More particularly the invention pertains to braking the wheels of a hydraulic hybrid vehicle.

Hydraulic Power Assist (HPA) is a type of hydraulic hybrid vehicle, in which energy from regenerative braking or from an engine is stored in a hydro-pneumatic accumulator, and the conversion between mechanical power and hydraulic power is achieved through high pressure pump/motor having a variable volumetric displacement. In an HPA system, using stored energy from regenerative braking to help accelerate the vehicle reduces the burden on the engine and reduces fuel use.

Because of the high power density available with such hydraulic systems, it is possible to recover efficiently a significant portion of braking energy with an HPA system comprised of a single pump/motor and storage accumulators. With a 7000 lb. vehicle and a pump/motor whose maximum displacement is 150 cc., an HPA system can recover 72 percent of the available braking energy in the Environmental Protection Agency (EPA) city cycle. The pump/motor operates for long periods at higher displacements and with a relatively high cycle average efficiency of 88 percent. With a return of 56 percent of the braking energy to the drive wheels (72 percent recovered in braking, and 88 percent transfer efficiency in both pumping and motoring), it is possible to recover 56 percent of the vehicle kinetic energy (or 75 percent of the velocity) while accelerating, neglecting road load friction. In the EPA city cycle it was possible to fill the hydraulic system when braking from 30 mph and then moderately accelerate again to about 22 mph using only stored energy from the HPA system.

SUMMARY OF THE INVENTION

Using regenerative braking energy for vehicle acceleration can provide a significant fuel economy benefit without the complications of engine start-stop capabilities or cruise load leveling. Since HPA can provide this fuel economy benefit without significant changes to the conventional powertrain, it is possible to achieve the fuel economy benefit without adversely affecting vehicle performance.

It is also possible to significantly augment vehicle performance over the engine-only powertrain, especially in a heavier vehicle. Fuel economy and performance benefits can be optimized for a given application.

A system for braking the wheels of a hydraulic hybrid vehicle includes a brake pedal having a range of pedal displacement including a deadband displacement range, an accumulator containing fluid at relatively high pressure, a reservoir containing fluid at lower pressure, a pump/motor having variable volumetric displacement connected to the accumulator and reservoir, and driveably connected to the wheels; a system responsive to brake pedal displacement in the deadband range for placing the pump/motor in a pump state wherein the pump/motor is driven by the wheels and pumps fluid from the reservoir to the accumulator; and a control valve for changing the volumetric displacement of the pump/motor in response to displacement of the brake pedal.

The invention relates to a method for braking the wheels of a vehicle that includes an accumulator containing fluid at relatively high pressure, a reservoir containing fluid at lower pressure, a pump/motor having variable volumetric displacement connected to the accumulator and reservoir are driveably connected to the wheels, and a brake pedal having a range of pedal displacement. A desired vehicle is determined on the basis of the pedal displacement, and a magnitude of braking force to decelerate the vehicle at the desired deceleration is determined. A wheel torque corresponding to the required braking force, a net wheel torque to stop the vehicle at the desired deceleration from a current vehicle speed, and a torque magnitude to be applied to the pump/motor by the wheels based on the net wheel torque are determined. Then the pump displacement corresponding to the magnitude of torque to be applied to the pump/motor by the wheels to produce the desired deceleration rate is determined. Finally, the magnitude of pump displacement is changed to the pump displacement corresponding to the torque magnitude to be applied by the wheels to the pump/motor.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
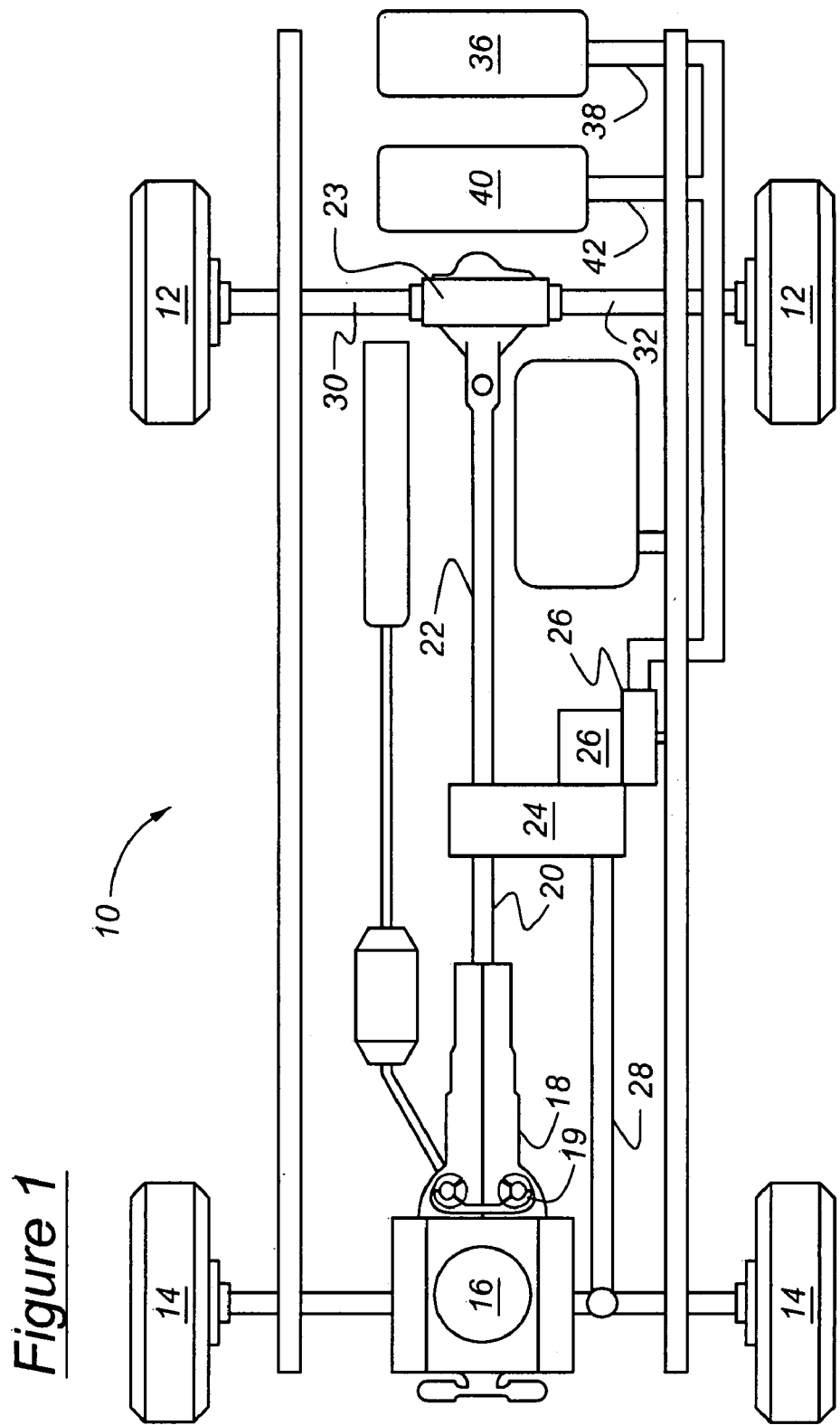
FIG. 1 is a schematic diagram of a powertrain for a hydraulic hybrid motors vehicle that operates in a brake regenerative mode and power assist mode.

Referring now to the drawings, there is illustrated in FIG. 1 a hydraulic hybrid powertrain 10 for driving the rear wheels 12, 14 of a motor vehicle. A power source 16, such as an internal combustion engine, is driveably connected to a transmission 18, preferably an automatic transmission producing multiple ratios of the speed of the engine and the speed of an output shaft 20. Suitable alternative transmissions include those that are manually operated, and those that produce continuously variable speed ratios or infinitely variable speed ratios, having chain drive, belt drive or traction drive mechanisms. The powertrain can be adapted to drive the front wheels 14 instead, and may include a transfer case for operating in all-wheel drive or four-wheel drive modes.

A pump/motor 26 having variable displacement is driveably connected to the transmission output shaft 20 and to a driveshaft 22. When torque is transmitted in a positive torque direction, from the engine to the wheels, output shaft 20 drives the pump/motor 26; when torque is transmitted from the wheels to the engine, the negative torque direction, driveshaft 22 drives the pump/motor 26.

During the power assist mode, while the vehicle is accelerating, pressure in accumulator 40 is released, high pressure fluid drives the pump/motor 26, and the wheels 12 are driven in rotation by the pump/motor, which operates then as a fluid motor. The motor 26 drives the wheels 12 through the driveshaft 22, differential 23 and the axles 30, 32.

During the brake regeneration mode, while the vehicle is decelerating while being braked, vehicle kinetic energy or momentum is initially reduced by causing the wheels 12 to drive the pump/motor 26 through the axles 30, 32 and driveshaft 22. The pump/motor 26 operates during the brake regeneration mode as a pump across a pressure differential between the pump inlet 112, which communicates with reservoir 36, and the pump outlet 90, which communicates with accumulator 40. The pump/motor 26 pumps fluid from reservoir 36 to the accumulator 40. Fluid entering the accumulator 40 compresses nitrogen contained in a bladder located in the accumulator 40, and the accumulator is pressurized.

Figure 2:
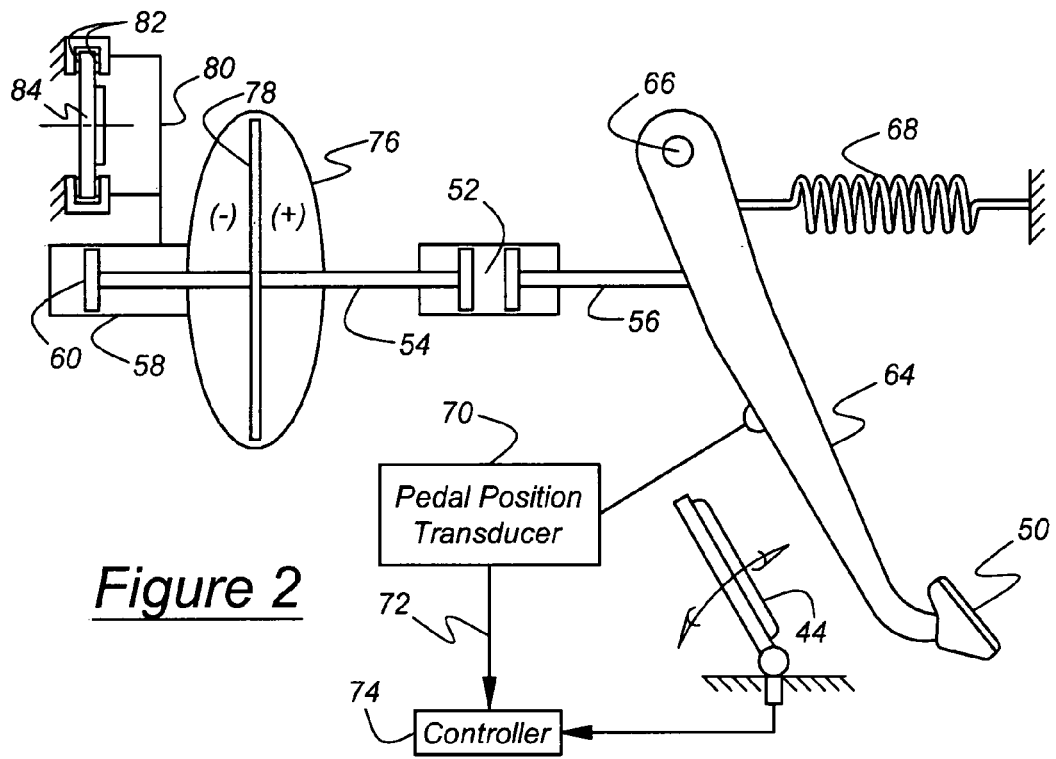
FIG. 2 is a schematic diagram of a brake pedal for use in controlling the brake regeneration mode of the powertrain of FIG. 1.

Referring now to FIG. 2, in a conventional vehicle, when the foot brake pedal 50 is applied, the vehicle decelerates due to friction braking, i.e., frictional contact of brake pads or brake shoes on wheel brake rotors or drums. The kinetic energy of the vehicle is converted by this frictional contact to heat, which is dissipated. In a deadband parallel regenerative braking system, a space 52 is located between connecting rods, 54, 56, which connect a brake master cylinder 58 and the foot brake pedal 50. The space 52 causes the brake pedal to move from the rest position shown in FIG. 2 through a first portion of its full displacement before hydraulic brake pressure is generated in the master cylinder due to movement of the piston 60 within the master cylinder 58. This delays the application of the wheel friction brakes as the pedal is being displaced. The range of brake pedal displacement in which no friction braking occurs, called the "deadband" region, is preferably about 30 percent of the full range brake pedal displacement beginning when the brake pedal is at rest and not displaced.

A tension spring 68, fastened to a brake lever 64 between the fulcrum 66 and the pedal 50, provides a force sensed by the vehicle operator and resisting brake pedal displacement in the deadband range. The force of spring 68, produced when depressing the brake pedal 50, compensates for the absence of a hydraulic pressure force opposing pedal displacement and piston movement in the master cylinder while the pedal is in the deadband range. A brake pedal position transducer 70 produces an electronic signal carried on line 72 to an electronic controller 74, the signal representing brake pedal position. Controller 74 operates under control of a microprocessor, which executes programmed logic. A power brake canister 76 contains a piston 78, which is actuated by engine vacuum to increase the force applied to connecting rod 54 by depressing the brake pedal 50.

Pressure in the hydraulic brake system 80, which actuates friction brakes 82, changes when pressure in the master cylinder 58 changes due to movement of piston 60 as the brake pedal 50 is displaced. When the brake pedal 50 is depressed beyond the deadband range sufficiently to close the space 52, brake system pressure forces the brake pads into frictional contact with the brake disc 84, to which a wheel 12 is fixed.

Figure 3:
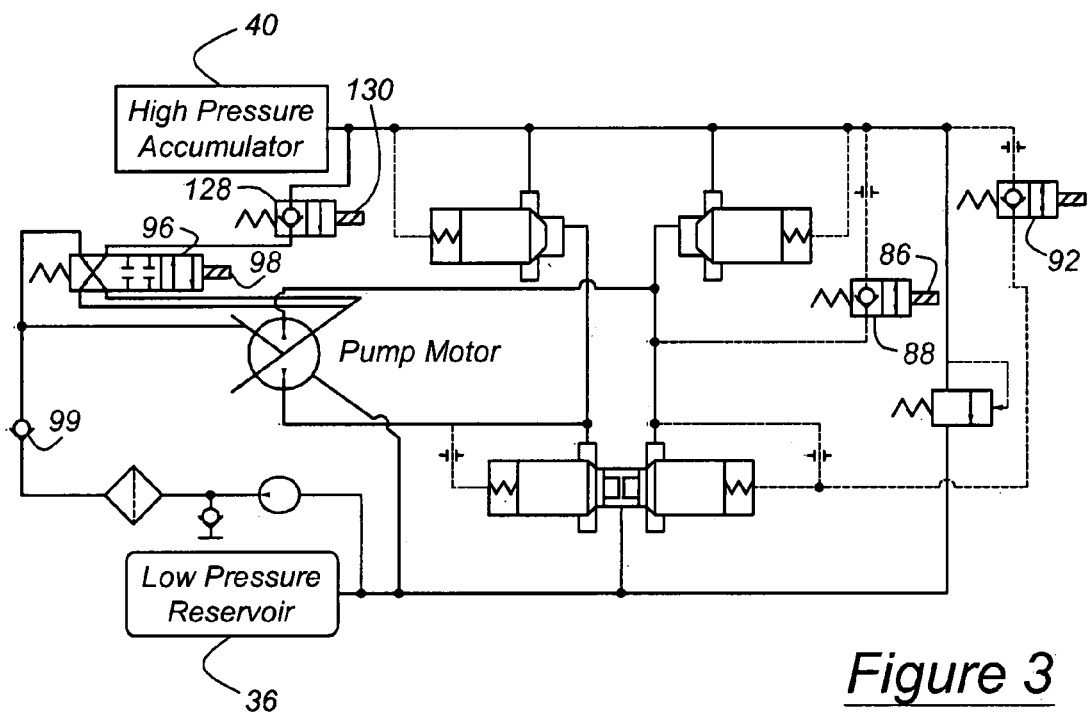
FIG. 3 is a hydraulic circuit diagram showing the pump/motor, accumulator, control valves and hydraulic lines connecting them.

In addition to the friction brakes, the vehicle is braked also by a regenerative brake system. While the brake pedal 50 is depressed, the operating states of hydraulic pump/motor 26 are changed between a pump state and motor state in response to command signals produced by controller 74 and supplied to a solenoid 86, which operates a mode valve 88. When valve 88 is in the position shown in FIG. 3, the pump/motor 26 is connected hydraulically to the high pressure accumulator 40, and the system operates in the motor mode, in which the wheels 12, 14 are driven by the motor 26 being actuated by high pressure fluid from accumulator 40. When the state of valve 88 is changed by solenoid 86 in response to a command signal from controller 74, the pump/motor 26 is connected hydraulically to the low pressure reservoir 36, and the system operates in the pump mode, in which the wheels 12, 14 drive pump 26, which pumps fluid from reservoir 36 to accumulator 40.

A swashplate control valve or proportional valve 96 changes the variable displacement of the pump/motor 26 in response to commands issued by controller 74. Pump displacement is directly related to the torque necessary to rotate the pump rotor at a given hydraulic pressure. When the brake pedal 50 is in the deadband range, the system operates in the pump mode, and vehicle braking is entirely accomplished by the pump 26. If the brake pedal is displaced past the deadband range, vehicle braking is accomplished by a combination by regenerative braking and friction braking in the correct proportion to achieve the vehicle deceleration rate desired by the vehicle operator.

Solenoid 98 changes the state of valve 96 among three positions or states, a center position where the inlet and outlet of valve 96 are mutually disconnected, a left-hand position where displacement of the pump/motor 26 decreases, and a right-hand position where displacement of the pump/motor 26 increases. An isolation valve 128, controlled by solenoid 130 in response to command signals from controller 74, alternately opens and closes a connection between accumulator 40 and an inlet of valve 96. The reservoir 36 is connected to an inlet of valve 96 through a check valve 99. When valve 96 is in the left-hand state, the state shown in FIG. 3, accumulator 40 is connected through valves 128 and 96 to the pump/motor 26. Pressure from accumulator 40 changes the angular position of a swashplate in the pump/motor 26 tending to increase the swashplate angle and decrease the volume of fluid that passes through the pump/motor 26 during each revolution, its volumetric displacement. When valve 96 moves to the right-hand state illustrated in FIG. 3, accumulator 40 is connected through valves 96 and 128 to change the angular position of the swashplate, tending to decrease the swashplate angle and increase volumetric displacement of the pump/motor 26.

Figure 4:
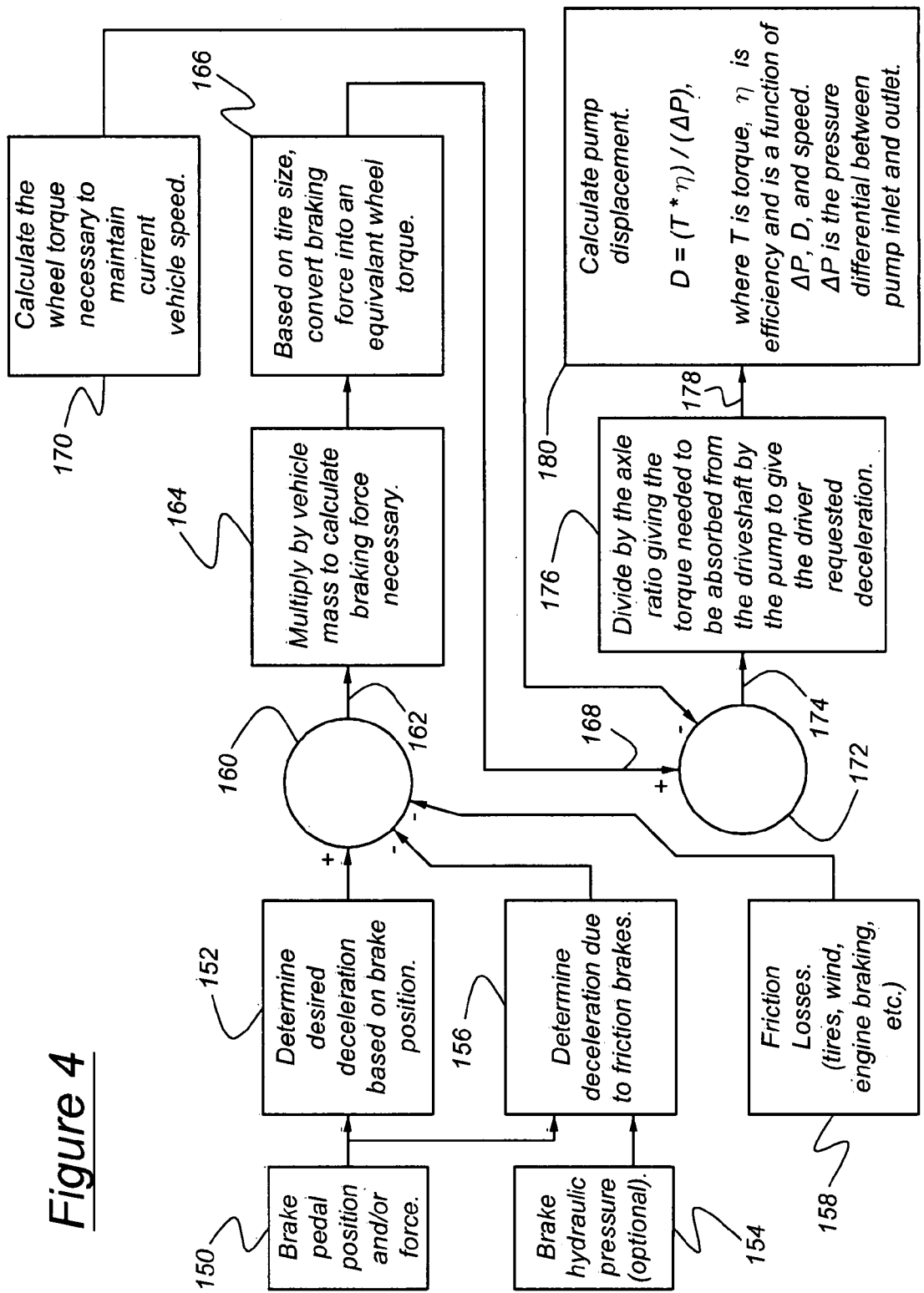
FIG. 4 is diagram of logic for controlling the brake regeneration mode in a deadband range of brake pedal position.

Referring now to FIG. 4, after the vehicle operator depresses the brake pedal, the extent to which the brake pedal is depressed 150, called "brake pedal position," is used to determine the current desired vehicle deceleration rate 152. Brake system hydraulic pressure 154 at the wheel brakes is used with the brake pedal position 150 to determine the corresponding vehicle deceleration rate due to applying the friction brakes 156. Parasitic drag on the vehicle 158 due to tire friction and air friction, and the effects of engine braking are used to determine vehicle deceleration due to these factors. The vehicle deceleration rates 150, 156, 158 are added algebraically at summing junction 160 to produce a net vehicle deceleration rate 162.

At 164, the vehicle mass is multiplied by the net vehicle deceleration rate 162 to produce the magnitude of force, which if applied to the vehicle, would produce the net vehicle deceleration rate.

That force is converted at 166 to an equivalent wheel torque using the tire size and a nominal coefficient of friction between the tires and the road surface. At 170, the wheel torque required to maintain the current vehicle speed is calculated. At summing junction 172, the magnitude of the difference between torques 166 and 170 is calculated to determine the change in wheel torque 174 necessary to stop the vehicle from the current speed at the desired deceleration rate 152.

At 176, that differential torque 174 is divided by the axle ratio to determine the magnitude of torque 178 that must be deducted from the torque transmitted by the driveshaft 22 to the pump motor 26 in order to produce the desired vehicle deceleration rate 152. Then at 180, the pump displacement corresponding to torque 178 is calculated. The controller 74 produces a command signal that is transmitted to solenoid 98 of the proportional valve 96 in order to change the angular position of the swashplate and to change the displacement of the pump/motor 26 to the calculated pump displacement calculated at 180.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A system for braking the wheels of a hydraulic hybrid vehicle, comprising:
   a brake pedal having a range of pedal displacement including a deadband displacement range;
   an accumulator containing fluid at relatively high pressure;
   a reservoir containing fluid at lower pressure;
   a pump/motor having variable volumetric displacement connected to the accumulator and reservoir, and driveably connected to the wheels;
   a controller determining a desired vehicle deceleration on the basis of the pedal displacement, determining a vehicle deceleration due to current friction braking based on brake hydraulic pressure and brake pedal displacement, determining the vehicle deceleration due to engine braking and friction braking, determining a net vehicle deceleration from the desired vehicle deceleration, and the vehicle deceleration due to current friction braking and engine braking and multiplying the net vehicle deceleration by vehicle mass, determining a magnitude of braking force to decelerate the vehicle at the desired deceleration, determining a wheel torque corresponding to the required braking force, determining a net wheel torque to stop the vehicle at the desired deceleration, from a current vehicle speed, determining a torque magnitude to be applied to the pump/motor by the wheels based on the net wheel torque, determining the pump displacement corresponding to the magnitude of torque to be applied to the pump/motor by the wheels, and producing a command signal representing a magnitude of pump displacement corresponding to the torque magnitude to be applied by the wheels to the pump/motor; and
   a control valve for changing the volumetric displacement of the pump/motor in response to said command signal.

2. The system of claim 1, wherein the brake means is responsive to brake pedal displacement outside the deadband range for placing the pump/motor in a motor state wherein fluid from the accumulator drives the pump/motor and wheels.

3. The system of claim 1, wherein the control valve changes the volumetric displacement of the pump/motor while the pump/motor operates in the pump state.

4. The system of claim 2, wherein the control valve changes the volumetric displacement of the pump/motor while the pump/motor operates in the motor state.

5. The system of claim 1, further comprising:
   a friction brake system responsive to displacement of the brake pedal for applying and releasing friction brakes located at the wheels.

6. The system of claim 1, further comprising:
   a friction brake system for applying and releasing friction brakes at the wheels in response to displacement of the brake pedal outside the deadband range; and
   said controller is responsive to brake pedal displacement outside the deadband range for placing the pump/motor in a pump state wherein the pump/motor is driven by the wheels and pumps fluid from the reservoir to the accumulator.

7. The system of claim 1, wherein said controller further comprises multiplying the magnitude of the braking force to decelerate the vehicle at the desired deceleration by a tire radius extending from a wheel axis to a location where the tire and a road surface are in frictional contact.

8. The system of claim 1, wherein said controller farther comprises:
   determining a wheel torque required to maintain a current vehicle speed; and
   subtracting the wheel torque corresponding to the required braking force from a wheel torque required to maintain a current vehicle speed.

9. The system of claim 1, further comprising:
   a friction brake system responsive to displacement of the brake pedal for applying and releasing friction brakes located at the wheels; and wherein
   the brake pedal further comprises a connector for connecting the brake pedal to the friction brake system, the connector defines the deadband range wherein brake pedal displacement is not transmitted to the friction brake system, and a second range outside the deadband range wherein brake pedal displacement is transmitted to the friction brake system.

10. The system of claim 1, further comprising:
    a primary power source; and
    wherein the pump/motor is hydraulically connected to the accumulator and reservoir, and the primary power source is driveably connected to the wheels.

11. The system of claim 1, wherein said controller further comprises calculating the pump displacement from $D=[T*\eta]/\Delta P$, wherein D is the volumetric displacement of the pump/motor, T is the magnitude of torque to be applied to the pump/motor by the wheels, $\eta$ is operating efficiency of the pump/motor, and $\Delta P$ is a pressure differential between an inlet and an outlet of the pump/motor.

12. A method for braking the wheels of a vehicle that includes an accumulator containing fluid at relatively high pressure, a reservoir containing fluid at lower pressure, a pump/motor having variable volumetric displacement connected to the accumulator and reservoir and driveably connected to the wheels, and a brake pedal having a range of pedal displacement, the method comprising the steps of:
    determining a desired vehicle deceleration on the basis of the pedal displacement;
    determining a magnitude of braking force to decelerate the vehicle at the desired deceleration;
    determining a wheel torque corresponding to the required braking force;

determining a net wheel torque to stop the vehicle at the desired deceleration from a current vehicle speed including the steps of determining a wheel torque required to maintain a current vehicle speed, and subtracting the wheel torque corresponding to the required braking force from a wheel torque required to maintain a current vehicle speed;

determining a torque magnitude to be applied to the pump/motor by the wheels based on the net wheel torque; and determining the pump displacement corresponding to the magnitude of torque to be applied to the pump/motor by the wheels; and changing the magnitude of pump displacement to the pump displacement corresponding to the torque magnitude to be applied by the wheels to the pump/motor.

13. The method of claim 12, wherein the step of determining a force to decelerate the vehicle at the desired deceleration, further comprises:

determining a vehicle deceleration due to current friction braking based on brake hydraulic pressure and brake pedal displacement;

determining the vehicle deceleration due to engine braking and friction braking;

determining a net vehicle deceleration from the desired vehicle deceleration, and the vehicle deceleration due to current friction braking and engine braking; and multiplying the net vehicle deceleration by vehicle mass.

14. The method of claim 12, wherein the step of determining a wheel torques corresponding to the required braking force, further comprises:

multiplying the magnitude of the braking force to decelerate the vehicle at the desired deceleration by a tire radius extending from a wheel axis to a location where the tire and a road surface are in frictional contact.

15. The method of claim 12, wherein the step of determining the pump displacement corresponding to the magnitude of torque to be applied to the pump/motor by the wheels, further comprises:

calculating the pump displacement from $D=[T*\eta]/\Delta P$, wherein D is the volumetric displacement of the pump/motor, T is the magnitude of torque to be applied to the pump/motor by the wheels, $\eta$ is operating efficiency of the pump/motor, and $\Delta P$ is a pressure differential between an inlet and outlet of the pump/motor.

* * * * *